(No Model.)
J. J. VAN HEST.
FILTERING STOPPER FOR BOTTLES.
No. 550,899. Patented Dec. 3, 1895.
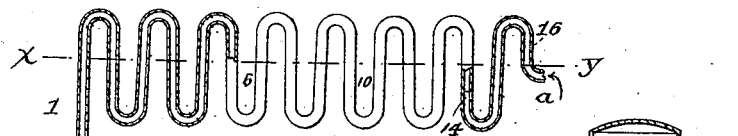
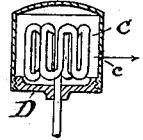
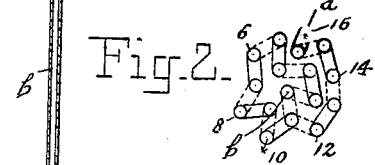
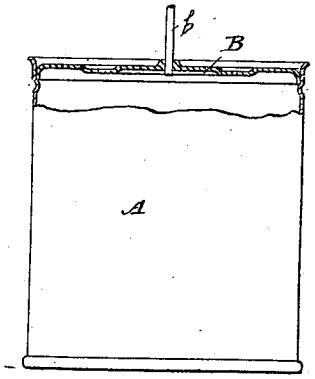
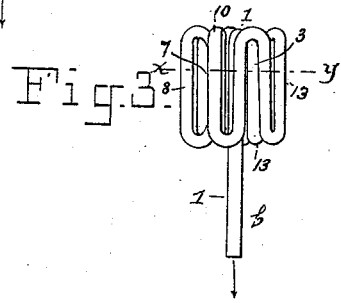
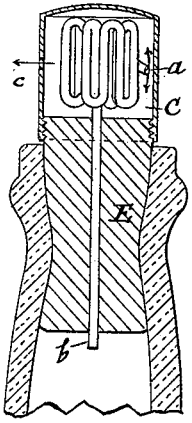
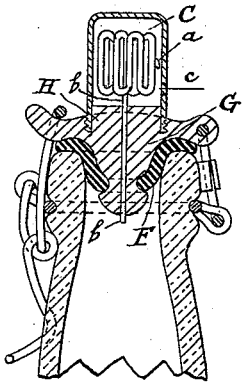
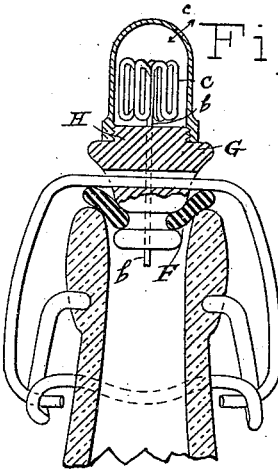
WITNESSES:
INVENTOR
Johannes Jacobus van Hest.
BY
Richardson
ATTORNEYS

UNITED STATES PATENT OFFICE.

JOHANNIS JACOBUS VAN HEST, OF AMSTERDAM, NETHERLANDS.

FILTERING-STOPPER FOR BOTTLES.

SPECIFICATION forming part of Letters Patent No. 550,899, dated December 3, 1895.

Application filed January 11, 1894. Serial No. 496,461. (No model.) Patented in Italy December 31, 1893, No. 35,111.

*To all whom it may concern:*

Be it known that I, JOHANNIS JACOBUS VAN HEST, analytical chemist, residing at 109 da Costastraat, Amsterdam, in the Kingdom of the Netherlands, have invented an Improvement in Air-Filtering Stoppers for Bottles, &c., (for which I have received a patent in Italy, dated December 31, 1893, No. 35,111,) of which the following is a specification.

This invention relates to air-filtering stoppers or closing devices for bottles, jars, preserve boxes or tins, and the like; and it consists of a device for admitting sterilized air into the said vessel, so that while the vessel is for all practical purposes closed and its contents protected a connection is maintained between the interior of the vessel and the atmospheric air, which as it enters is freed from bacteria and impurities.

It is a well-known fact that unless the liquid or solid contents of vessels of this description are allowed to come into contact with bacteria they cannot be contaminated. For this reason liquids and other substances which it is desired to preserve in a pure and uncorrupt condition have hitherto been first sterilized by boiling and then placed in vessels or receptacles, which were closed hermetically. Now it has been ascertained by M. Pasteur that liquids after boiling may be kept in a disinfected condition even though air be constantly admitted to them, provided the air is made to pass through a glass tube bent in a straight line or plane, so as to form a series of knees or bends, and is fused or welded into the neck of the bottle containing the liquid. As the air passes through this bent tube the bacteria are arrested by the bends or turnings of the said tube, and thus prevented from entering the bottle. In spite, however, of the importance of this discovery and the many purposes to which it may be applied it is nevertheless a fact that in making bacteriological experiments in laboratories it is impossible to use glass tubes bent in a straight line, as stated, in connection with the apparatus of which the said experiments necessitate the employment; yet the results of bacteriological experiments have as far as practicable been for years turned to account by manufacturers, and the destruction of bacteria and germs of disease in articles of food as a means of protecting the latter from corruption has always attracted special attention. Much difficulty, however, has had to be contended with in thus attempting to utilize the discoveries of science, and one of the most troublesome questions has proved to be that which concerned the closing of these bottles or other receptacles. As up to the present time bottles, jars, and the like could not be closed till after their contents had been sterilized or disinfected, the short time which elapsed between the completion of the sterilizing process and the closing of the vessels was sufficient to readmit air with such infectious germs or animalculæ as it might carry with it.

The air-filtering stopper or cover for bottles, jars, preserve boxes or tins, and the like, which forms the subject of this invention and the construction of which is based upon Pasteur's principle, is adapted to be employed instead of a long extended tube, which being fragile and taking up much space is unfit for use for industrial purposes; and it consists of a narrow tube of metal or other suitable material bent in several places, the bends or curves of which instead of being extended in the same plane are compressed into immediate juxtaposition and, as it were, fitted together.

The invention is illustrated in the accompanying drawings, in which—

Figure 1 is a tube extending in a set or series of flat bends or knees. Fig. 2 is a horizontal section on the line $x\ y$, Fig. 3; and Fig. 3 shows the parts of the bent or folded tube in elevation. Fig. 4 illustrates the employment of the air-filtering cover in connection with a preserve box, jar, or tin; and Figs. 5, 6, and 7 show the manner in which the invention is applied to bottles.

The tube, made of metal or other suitable material, is bent in several places, as shown, (having preferably from ten to fifteen bends,) and these bends or knees are closely fitted together, so that a compact set or series of bent tubes are formed, preferably, not wider than a bottle-cork in diameter. The straight lower end $b$ of the tube descends into the bottle, while the other bent portion thereof is situated above the cork and may be surmounted by or covered with a protecting-cap. The upper orifice $a$ of the tube is thus located within the set of curved tubes, and consequently is situated together with these above the cork.

In the case of preserve boxes or tins the air-filtering device is applied as follows: The box A, Fig. 4, is first filled and then the cover or lid B is soldered in position around its periphery. Into a small aperture provided in the lid a tube $b$ is fixed with solder in such a manner that its lower end terminates above the level of the contents of the tin or jar. These contents are then boiled, the air and vapor which rise therefrom escaping through the set of bent tubes. If a protecting-cap C be employed, it is provided with an outlet $c$. After the contents of the box have been allowed to cool the air-filtering device may be removed, the tube $b$ being cut or nipped off just over the lid. Where, however, it is desired to retain the air-filter, the length of tube $b$ should, preferably, be short, so as to enable the cap C to be secured to the lid direct. The protective cap C is here supposed to be screwed onto a bottom plate D, through which the tube $b$ protrudes downward, or it may be simply fitted thereto.

In the case of bottles stoppered with corks the tube $b$ is passed through a perforation in the cork E, the cap C being then placed over it and secured to the cork, Fig. 5.

Where closing devices such as are shown in Figs. 6 and 7 are used, the stopper G is provided with a perforation which, as in the arrangement shown in Fig. 7, may turn around the passage provided for the bent piece, and into this perforation a length of flexible tube $b$ is inserted, as shown in dotted lines in Fig. 7, which descends into the interior of the bottle through the india-rubber ring F.

The cap C may be fitted to a casting H integral with the stopper G, Fig. 6, or screwed thereto, Fig. 7, so as to form one connected whole therewith.

The merits of the novel air-filtering closing or stoppering device are as follows:

(a) The bottle, jar, &c., is closed (with or without solder) after having been filled, and not till after it is so closed are its contents boiled and allowed to cool without this involving any danger of bursting. When this is done, the contents of the vessel are completely sterilized and cannot be infected by the air admitted through the set or series of bent tubes. Hitherto bottles, jars, and the like could only be closed after sterilizing, and the short time elapsing between the sterilizing and closing operations was amply sufficient to allow the air to impart to the food or beverage a large quantity of infectious germs—a drawback which is entirely removed by the improved device.

(b) A bottle or other receptacle provided with the improved closing device may be placed in a horizontal position or even turned upside down, if desired, without allowing any of its contents to escape.

(c) The same device may be used over and over again, and when the contents of one bottle or jar are consumed it may directly be transferred to another, it being sufficient to "nip" or cut off the lower end of the tube in each case.

This new air-filtering closing device will be found particularly serviceable in preserving milk, beer, or other beverages which are introduced into the market in a "pasteurized" or disinfected condition.

The protecting-cap may be made of metal, glass, or other suitable material and assume a shape corresponding to that of the cork or stopper employed in any given case.

What I claim is—

In combination, in a bottle stopper, the stopper proper adapted to fit into the mouth of the bottle, the cap secured to the stopper and the metal tube bent into a number of sharp angular knees or bends and arranged against each other in compact form, said tube being smooth on its interior, perfectly dry and free from any interior coating, said tube extending through the stopper to communicate with the interior of the bottle and entirely through the cap to the outside air without connecting with an antiseptic chamber, substantially as described.

In witness whereof I have hereunto set my hand in presence of two witnesses.

JOHANNIS JACOBUS VAN HEST.

Witnesses:
ANTONIO DOYER,
THOMAS HERMANN VERHAVE.